July 14, 1970 J. POMAGALSKI ET AL 3,520,515
MANUALLY OPERATED WINCH EMPLOYING A TOOTHED PULLEY
Filed Dec. 11, 1967

United States Patent Office 3,520,515
Patented July 14, 1970

3,520,515
MANUALLY OPERATED WINCH EMPLOYING A TOOTHED PULLEY
Jean Pomagalski, La Tronche, and Marcel Durand, Grenoble, France, assignors to Jean Pomagalski S.A.
Filed Dec. 11, 1967, Ser. No. 689,612
Claims priority, application France, Dec. 28, 1966, 5,033; May 12, 1967, 106,408
Int. Cl. B66d 1/00
U.S. Cl. 254—167                                    3 Claims

ABSTRACT OF THE DISCLOSURE

A winch is provided with a grooved pulley capable of raising or hauling heavy loads whereby the two flanks defining the groove of the pulley are toothed and meshed with a sprocket coupled to a pivoting lever by the intermediary of a one-way coupling device. A disc braking device prevents the backwards rotation of the pulley and allows the lowering of the load..

---

This invention relates to winches comprising a grooved pulley driving a traction cable, a pivoting lever with which the pulley is intermittently rotated by means of a one-way coupling device, the pulley being prevented by a holding device from turning in the reverse direction.

The scope for the use of these manual winches is limited, because the effort to be exerted on the operating and holding pawls when a heavy load is being handled on the one hand makes all manual operation very ardous and on the other hand necessitates locking and holding devices of unacceptable dimensions. In order that the cable used for lifting or for hauling and passing through the groove in the pulley should not be subjected to bends that are too sharp, it is in fact necessary to use pulleys of larger diameters as the cables become larger in sectio nand stiffer. The torque exerted by the cable on the grooved pulley thus increases very rapidly and it cannot be overcome by a manually operated lever working directly.

The object of the invention is the realization of a hand operated winch with a grooved pulley capable of raising or hauling heavy loads.

With this object in view the invention provides for the circumferences of the two flanks defining the groove of the pulley to be toothed and meshed with a sprocket coupled to the said lever by the intermediary of the said one-way coupling device.

According to a development of the idea of the invention and profiting from one of the advantages of demultiplication the locking or braking devices are fitted on the axle of the sprocket, and these, in combination with the one-way operating devices, thus form an assembly for a given direction of rotation (raising of the load) which assembly is combined with a second one-way device which prevents descending movement.

Figure 1:
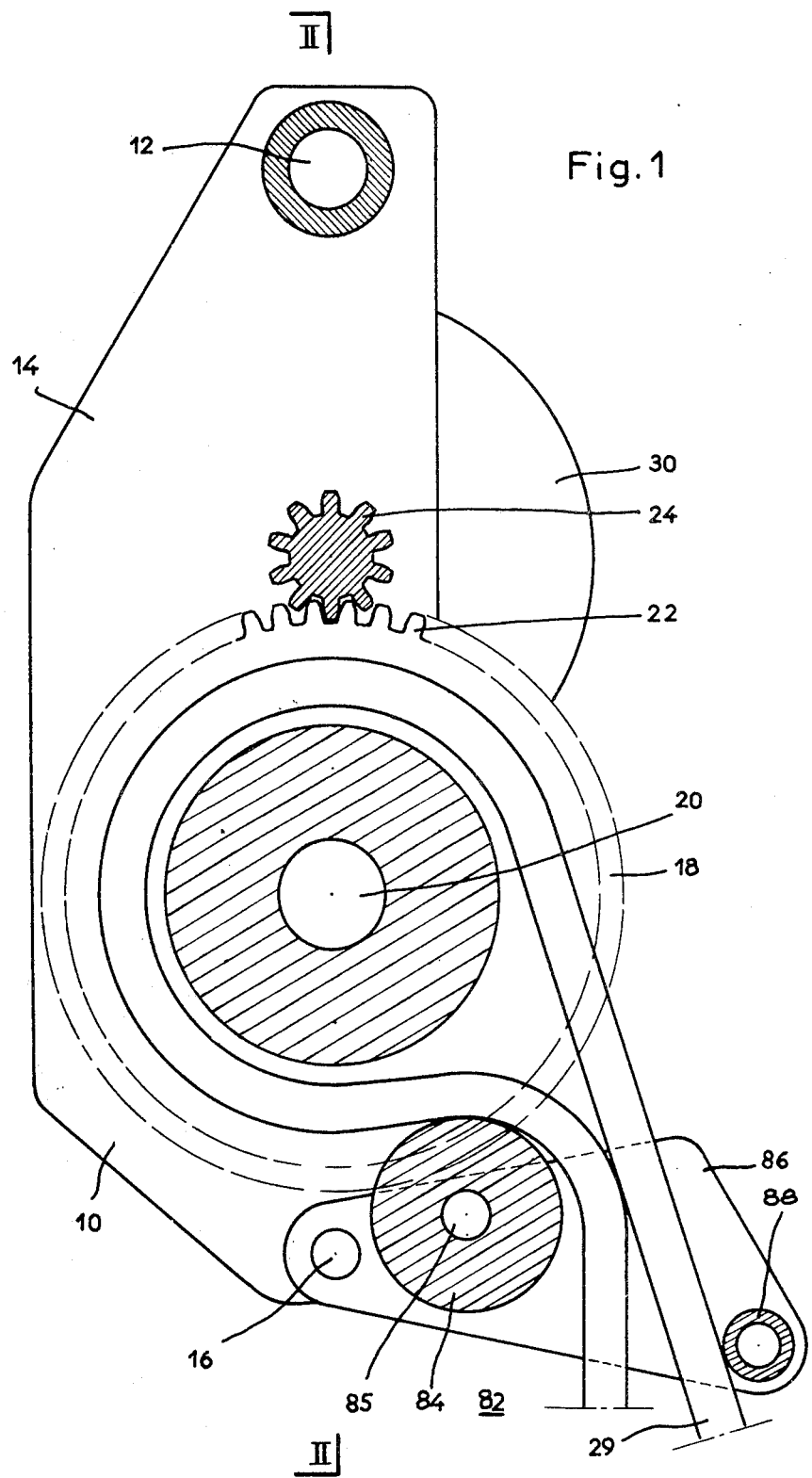
FIG. 1 is a section of a winch according to the invention following a median plane, perpendicular to the centrelines of the pulley and the sprocket.

On FIGS. 1 and 2, a chassis in the form of a yoke 10 comprises two side-plates in the form of steel plates, 14, 14' held rigidly apart by two axles 12, 16, axle 12 being able to serve at the same time for anchoring the winch, the other axle 16 serving as an articulation for a compression device which will be described below. A grooved pulley or sheave 18 can turn freely on an axle 20 which passes through side plates 14, 14' of frame 10. The two flanks 22, 22' of the V-shaped groove in pulley 18 define side walls which are tapered or converged in a radially inwardly extending direction, which are of appropriate thickness, each being provided with teeth 23, 23', so as to form a V-grooved toothed pulley 18.

The two series of teeth 23, 23' of pulley 18 mesh with a driving sprocket or gear wheel 24, rigidly fixed on a shaft 26 turning in bearings 25, 25', rigidly fixed in side plates 14, 14'. One of the ends of shaft 26 serves as pivot axle for an operating lever 28 and the other end coacts with a holding and braking device designated as a whole by reference 30. The diameter of the groove of pulley 18 is determined by the radial compressibility or flexibility of traction cable 29, in order that during its passage in the groove the admissible constraints are not exceeded. For a heavy duty winch necessitating relatively stiff cables of large section, this diameter may be of importance and the torque exerted by the cable on the grooved pulley makes the direct driving of the pulley by means of the lever practically impossible. By using the grooved pulley itself to form, according to the invention, the toothed wheel of a reduction gearing, a toothed wheel becomes available of which the diameter, imposed by the compressibility characteristics of the traction cable, will in general be as much larger as the effort to be provided is greater and in practice it will always be possible to achieve sufficient reduction to permit manual intermittent rotation of the pulley.

Operating lever 28 is articulated on the shaft 26 of the drive sprocket 24 and can drive this in rotation in the direction in which a load is raised, by the intermediary of a one-way coupling 32. This one-way coupling may be very simple, for example it may be comprised of a pawl and a ratchet wheel. In the example chosen, it consists of a free wheel mechanism with wedging rollers. Many devices of this kind from which a choice can be made exist in various techniques. It has been considered sufficient in this case to represent it by showing the two essential components, the inner bush 34, which is keyed onto shaft 26, and the outer bush which is rigidly fixed to operating lever 28.

A braking and holding device 30 is fixed on the other end of the shaft 26 which carries sprocket 24. This device may be of any type and so designed that rotation of shaft 26 in the direction corresponding with the raising of a load, not shown, fixed to the cable, is not impeded by the holding device 30, whereas when the shaft is rotated in the opposite direction (lowering of the load) the braking and holding device comes into operation.

The hauling or lifting cable 29 is introduced into the groove of toothed pulley 18 by passing it between the grooved toothed pulley and sprocket 24, of which the central part facing the groove may be silghtly indented, and through a compression device 82 (see FIG. 1) which maintains cable 29 in the groove. This compression device 82 may be of any type, and comprise a wheel subjected to the action of a spring, but use could also advantageously be made of a compression wheel 84 loose fitted on an axle 85 carried by a yoke 86 the side plates of which are articulated on frame 10 on bolt 16, for example, and carrying a wheel 88 coacting with the taut end of cable 29, in such a manner that under the effect of the tension in the cable compression wheel 84 is pressed into the groove of toothed pulley 18.

The winch according to the invention operates in the following manner. Frame 10 is attached to a fixed point with the aid of a device itself fixed on bolt 12 and the traction end of cable 29 is attached to the load not shown. Cable 29 is tautened manually when sliding it into the groove of the toothed pulley. This sliding-in of the cable is very easily accomplished, the compression wheel 84 being freed from the groove as long as the cable is not under tension. When the operating lever is then actuated by a to- and from movement, freewheel 32 will turn intermittently, in the usual way, shaft 26, sprocket 24 and grooved toothed pulley 18 which intermittently hauls cable 29. The retrograde movement of toothed pulley 18, under the effect of the load, during the return travel of operating lever 28, is prevented by the braking and locking device 30.

Figure 2:
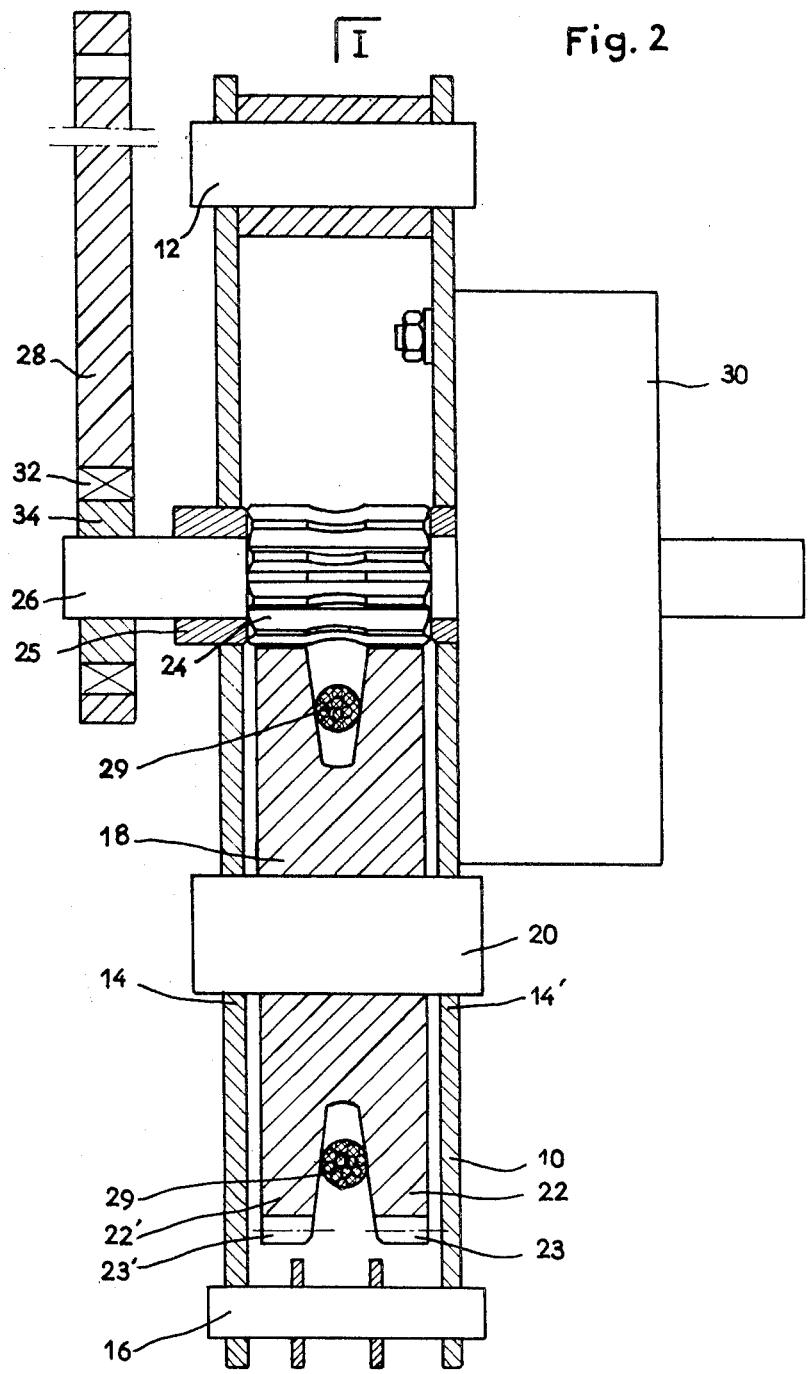
FIG. 2 is a view in section of the winch along the line II—II in FIG. 1.
Figure 3:
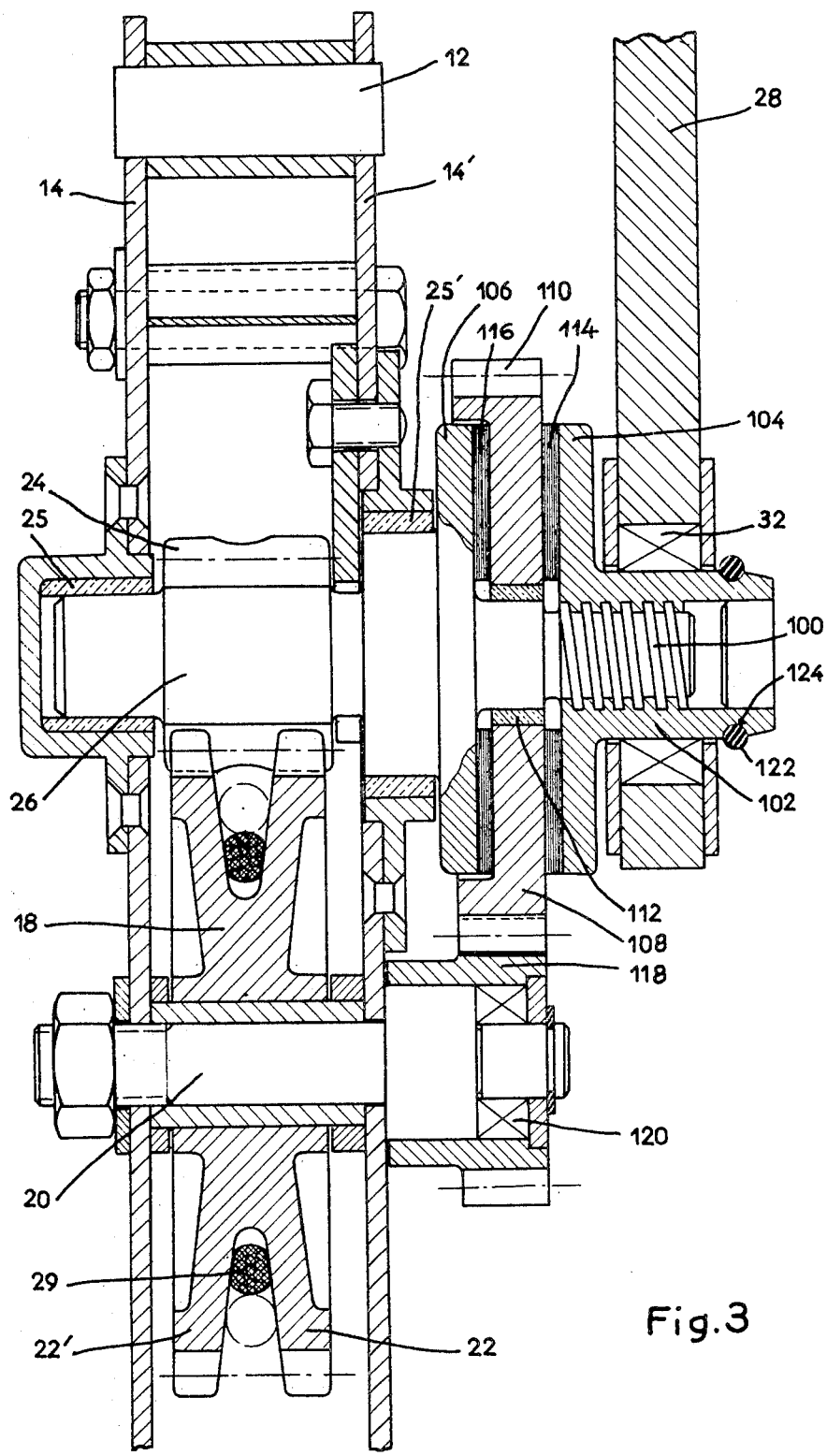
FIG. 3 shows in combination with a winch analogous with that shown in FIGS. 1 and 2, braking and one-way devices according to the invention.

On FIG. 3 the same reference numbers have been used to designate parts identical with or analogous to those described in FIGS. 1 and 2.

The grooved toothed wheel which can turn freely on a fixed axle 20 which passes through side plates 14, 14' of the frame will be recognised. The teeth on flanks 22, 22' of the groove of pulley 18 mesh with drive sprocket 24, which is rigidly fixed to shaft 26 swivelling in bearings 25, 25' carried respectively by side-plates 14, 14'. Traction cable 29 is engaged in the groove of pulley 18.

In the device according to the present invention, one of the ends of shaft 16 has a threaded part 100 on which is screwed a sleeve 102 which has a friction plate 104 on the end opposite to sprocket 24. A second friction plate 106 is rigidly fixed to shaft 26 and a disc 108 which has on its circumference teeth 110 is inserted between the two friction plates. Disc 108 turns freely on shaft 26, which carries for this purpose a bearing 112 between threaded part 100 and plate 106.

Friction linings 114, 116 are fixed on either side of disc 108, the assembly of the two plates 104, 106 and disc 108 forming a disc brake which is applied by screwing sleeve 102 on shaft 26.

In the applied position toothed disc 108 is coupled to shaft 26. The teeth 110 of disc 108 mesh with a sprocket 118 fitted so as to rotate on a fixed shaft which for preference is shaft 20 carrying grooved toothed pulley 18. A holding or anti-roll-back mechanism consisting of a one-way coupling 120, comprises a freewheel mechanism with wedging rollers, and is inserted between sprocket 118 and shaft 20, so as to permit rotation of sprocket 118, and thus of disc 108, only in the direction corresponding with the rotation of shaft 26 for the raising of a load.

Operating lever 28 is articulated on threaded sleeve 102, and can rotate this through the intermediary of a one-way coupling 32, for preference a freewheel with wedging rollers. The direction in which sleeve 102 is driven may be made reversible, for example, by removably mounting the assembly consisting of the operating lever 28 and freewheel or one-way coupling 32 on sleeve 102 which permits the removal and reversing of this whole. An elastic ring, or circlip 122 housed in a groove 124 on the outer circumference of sleeve 102 prevents untimely detaching of lever 28 and freewheel 32.

The direction of the threading 100 is such that an operating effort exerted by lever 28 in the direction in which the load is raised causes the approach of the two plates 104, 106 and locking of disc 108.

The device according to the present invention works in the following manner:

To raise or haul the load, operating lever 28 and its freewheel 32 are suitably fixed on sleeve 102, in such a way as to transmit to the latter an effort in the direction corresponding with the raising of the load.

The initial rotation of sleeve 102, which is imparted by operating lever 28, has the effect of screwing sleeve 102 on thread 100, and of pushing plate 104 rigidly attached to the sleeve 102 against disc 108. The latter is then wedged between the two plates 104 and 106 and the assembly consisting of sleeve 102, plates 104, 106, disc 108 and shaft 26 turn all together to drive sprocket 24 and grooved toothed pulley 18 in the direction in which a load is raised. Disc 108 obviously rotates the sprocket 118 with which it is meshed, a rotation which is permitted by the freewheel 120 which is inactive in this direction of rotation.

If the application of an effort on the operative lever 28 is ceased, it is easily seen that shaft 26 has a tendency to turn in the opposite direction to that of lifting, under the effect of the stress exerted by the load on cable 29. This rotation in reverse has also the effect of wedging disc 108 between the two plates 104, 106, the threaded end 100 of shaft 26 having a tendency to screw itself into sleeve 102. As previously, shaft 26, plates 104, 106 and disc 108 form a single mass the rotation of which in the opposite direction is prevented this time by the locking of sprocket 118 by a freewheel 120 which operates for a rotation in this direction.

Shaft 26, and thus grooved toothed pulley 18 and cable 29 are efficiently locked, the braking torque acting on the disc brake increasing with the load. By operation of lever 28 in a to and from movement, the load will be raised in the usual manner.

To lower the load, it is sufficient to withdraw lever 28 and its freewheel 32, to turn them round and replace them in the opposite direction on sleeve 102.

When an effort in the direction for lowering the load is applied on lever 28, this effort is transmitted by freewheel 32, active in this direction of rotation, to sleeve 102 which unscrews itself from thread 100 and separates plate 104 from plate 106. This provokes the release of the disc brake and permits plate 106 to turn while slipping on disc 108 under the effect of the load, which applies torque to shaft 26 associated with plate 106.

The speed of rotation of plate 106 can never, for all that, be greater than the speed of rotation of plate 104 and thus of sleeve 102, any relative movement in this direction of plate 106 in relation to plate 104 provoking the locking of the disc brake. The operation of such disc brakes being well known it is superfluous to describe it in greater detail.

The combination, according to the invention, of a grooved toothed wheel with a reduction sprocket and a disc brake, permits the obtaining of easy and efficient traction of the cable by the action of a simple, compact and perfectly safe mechanism, as the load is automatically locked. The use of free wheels with wedging rollers contributes to the increase in safety in operation. The invention is of course in no way limited to the method of application most particularly described, but covers any variation remaining within the scope of mechanical equivalents.

What is claimed is:

1. A winch comprising: a rotatably mounted pulley having two circumferentially toothed flanks having side walls converging inwardly towards the axis of rotation of said pulley defining therebetween a tapered cable-receiving groove; a radially compressible traction cable positioned within a portion of said groove; means operable when said cable is under load to effectively compress and wedge a portion of one coil of said cable in said groove; a rotatably mounted toothed drive sprocket in mesh with said toothed flanks of said pulley; a removably mounted one-way coupling connected to rotationally drive said drive sprocket in one direction; an operating lever connected to said one-way coupling to rotationally drive same; a holding device connected to said pulley for preventing rotation of said pulley in the other direction; and a braking device including an axle rotationally rigid with said sprocket and on which said one-way coupling is mounted.

2. A winch according to claim 4, wherein said disc brake includes a toothed disc, and wherein said holding device comprises a toothed one-way coupling in meshing engagement with said toothed disc.

3. A winch according to claim 1, wherein said braking device comprises a disc brake.

References Cited

UNITED STATES PATENTS

| | | | |
|---|---|---|---|
| 676,994 | 6/1901 | O'Keefe. | |
| 2,165,984 | 7/1939 | Schroeder | 254—167 |
| 2,424,910 | 7/1947 | Benson | 254—186 |
| 2,561,139 | 7/1951 | Sasgen | 254—186 |
| 2,917,278 | 12/1959 | Arnold | 254—167 |
| 3,047,114 | 7/1962 | Stevens | 254—167 |
| 3,100,031 | 8/1963 | Lock | 254—167 |

FOREIGN PATENTS 1,411,691  12/1965  France.

HARVEY C. HORNSBY, Primary Examiner

U.S. Cl. X.R.

254—175.5, 150, 186; 188—82.7